March 26, 1968  B. BENTJENS  3,374,518
HOB

Filed Sept. 16, 1965  3 Sheets-Sheet 1

INVENTOR:
Bernd Bentjens

BY
Michael J. Striker
his ATTORNEY

March 26, 1968     B. BENTJENS     3,374,518
HOB

Filed Sept. 16, 1965     3 Sheets-Sheet 2

Inventor
Bornd Bentjens
by
Michael J. Striker
Atty

United States Patent Office 3,374,518
Patented Mar. 26, 1968

3,374,518
HOB
Bernd Bentjens, Schwarzenbek, near Hamburg, Germany, assignor to Fa. Wilhelm Fette Prazisionswerkzeug-Fabrik, Schwarzenbek, near Hamburg, Germany
Filed Sept. 16, 1965, Ser. No. 487,825
Claims priority, application Germany, Sept. 18, 1964, F 44,004
11 Claims. (Cl. 29—103)

ABSTRACT OF THE DISCLOSURE

A rotary milling cutter includes a plurality of teeth which define a helix about the periphery of the cutter and which are arranged in a plurality of substantially axially extending rows. Some of the rows consist of teeth having a first length and others of the rows consist of teeth having a length which is less than the first length, and all teeth of all rows have a top land provided with a cutting edge and two mutually inclined side faces which flank the cutting edge. The mutual inclination of the side faces is the same for all of the teeth of the cutter.

The present invention relates to improvements in milling cutters, particularly to improvements in hobs and similar cutting or material removing tools. Still more particularly, the invention relates to improvements in hobs of the type which, though especially suited for rough hobbing operation, can be used with equal advantage for finish hobbing of gear blanks and similar workpieces.

Roughing hobs, particularly in the larger sizes, are becoming increasingly important in various industries, and many attempts are known to improve the cutting properties of conventional roughing hobs. For example, it is already known to select the chamfer with a view to distribute the cutting load to as many hob teeth as possible. It is also known to set the hob teeth slightly out of their normal plane or to assemble the hob of a series of disks which may be angularly offset with reference to each other for the purpose of more convenient grinding or sharpening and which may be separated by spacer disks to insure better utilization of the roughing teeth, especially in hobbing of gears with a large number of teeth.

It was found that the above-enumerated proposals are not entirely satisfactory, either because the hob cannot be formed with a sufficiently large number of teeth or because the wear on hob teeth is excessive. As a rule, the wear begins in the zone at the top lands of hob teeth and progresses, with a considerable delay, toward the flanks. In rough hobbing of large gear blanks with a single hob, wear at the top lands in the range of 4–5 mm. is often permissible. This is due to the fact that the flanks of hob teeth remain largely unaffected by wear even though the outermost portions of teeth at the top lands thereof undergo considerable wear, i.e., the involute shape of teeth on the workpiece is not affected by such extensive wear at the top lands. However, a hob which is worn away at the top lands of its teeth can be reground or resharpened only by removing extremely large quantities of material. It was considered that a reduction in the wear on hob teeth in the region of top lands can be brought about only by increasing the overall number of teeth; this, however, results in an undesirable increase in the diameter of the tool. Large-diameter hobs are not in demand because the time required to complete a hobbing operation with a smaller-diameter hob is less than that required by a relatively large hob.

Accordingly, it is an important object of the present invention to provide a novel and improved hob which is constructed and configurated in such a way that it avoids the drawbacks of aforementioned conventional hobs and that the wear at the top lands (free outer ends) of its teeth is reduced in a very simple and unobvious manner.

Another object of the invention is to provide a cutter which can be used for rough hobbing and/or finish hobbing and which can be provided with a large number of teeth without unduly increasing its diameter.

A further object of the invention is to provide a novel method of producing a hob which embodies the just outlined features and advantages.

An additional object of the invention is to provide a hob whose operation is quieter and smoother than the operation of conventional hobs.

My invention is based on the recognition that, in making a rough cut in a gear blank or a similar workpiece, by far the major percentage of material (about 75 percent) must be removed by the outermost portions of hob teeth, i.e., by the outer thirds of such teeth. The median thirds of hob teeth remove about 19 percent, and the innermost portions at the roots of hob teeth remove only about 6 percent of material from a gear blank. This recognition is fully substantiated by measurements with a view to determine the wear on the teeth of conventional roughing hobs.

In order to reduce the wear on the outermost portions of hob teeth, I provide a roughing or finishing hob wherein axially or substantially axially extending rows of teeth having a greater length alternate with one or more rows of teeth having a lesser length. Thus, and by looking in the direction of the helix which is formed by the hob teeth, the teeth of each pair of consecutive teeth having a greater length are separated from each other by one or more teeth of lesser length. Such distribution of longer and shorter teeth renders it possible to increase the overall number of teeth on the hob and to thereby reduce the wear on the outermost portions in the regions of top lands of the teeth. Also, the operation of the hob is quieter and smoother than that of heretofore known hobs because, at each instant, the workpiece is treated by a relatively large number of teeth. The fact that only some of the teeth have a maximum length or depth does not affect the operation of the hob because, and as explained above, the inner portions of longer teeth must remove only about 6 percent of the total quantity of material which is being removed in rough hobbing of a gear blank. The top lands of all teeth are located at the same distance from the hob axis, i.e., the length or whole depth of teeth varies in a direction radially inwardly.

The novel features which are considered as characteristic of the invention are set forth in particular in the appended claims. The improved hob itself, however, both as to its construction and the method of producing the same, together with additional features and advantages thereof, will be best understood upon perusal of the following detailed description of certain specific embodiments with reference to the accompanying drawings, in which:

FIG. 2 is a fragmentary azial section as seen in the direction of arrows from the line II—II of FIG. 1a;

FIG. 2a is a fragmentary section as seen in the direction of arrows from the line III—III of FIG. 1a;

FIG. 2b is a fragmentary section as seen in the direction of arrows from the line IV—IV of FIG. 1a;

Figure 1:
FIG. 1 is a perspective view of a roughing or finishing hob with sixteen axially extending rows of teeth wherein each row comprises five teeth.

Referring first to FIGS. 1, 1a, 2, 2a and 2b, there is shown a roughing hob comprising three types of teeth 1, 2 and 3. The whole depth or length $h_2$ of teeth 2 exceeds the whole depth or length $h_3$ of teeth 3 but is less than the whole depth or length $h_1$ of teeth 1. The reference characters $t_1$, $t_2$ and $t_3$ respectively denote the chip groove depth of the teeth 1, 2 and 3 and the characters $b_1$, $b_2$, $b_3$ respectively denote the thickness of teeth 1, 2 and 3. The teeth 1 are the finishing teeth. They may be integral with the carrier body 4 or each thereof may be inserted into the body 4. The shape of the teeth 3 between the top lands $d_3$ and the planes denoting the whole depth or length $h_3$ corresponds to the shape of the outer half of a tooth 2 or to that of the outer third of a tooth 1. Also, the shape of the teeth 2 between the top lands $d_2$ and the planes denoting the whole depth or length $h_2$ corresponds to the shape of the outer two thirds of a tooth 1. It will be seen that the thickness $b_2$ of a tooth 2 is less than the thickness $b_1$ of a tooth 1 but exceeds the thickness $b_3$ of a tooth 3 so that, when they are caused to penetrate into the material of a gear blank, not shown, the teeth 3 and 2 are relieved on both sides in the direction of the pitch.

Figure 1A:
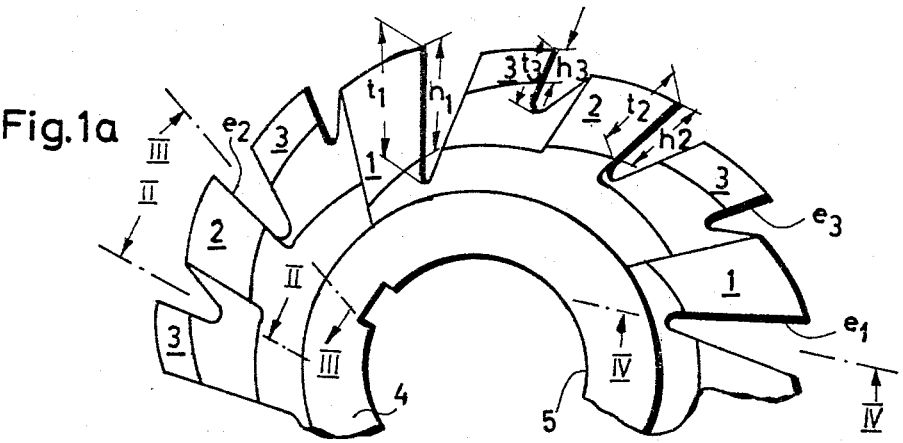
FIG. 1a is a fragmentary end elevational view of the hob shown in FIG. 1.
Figure 3:
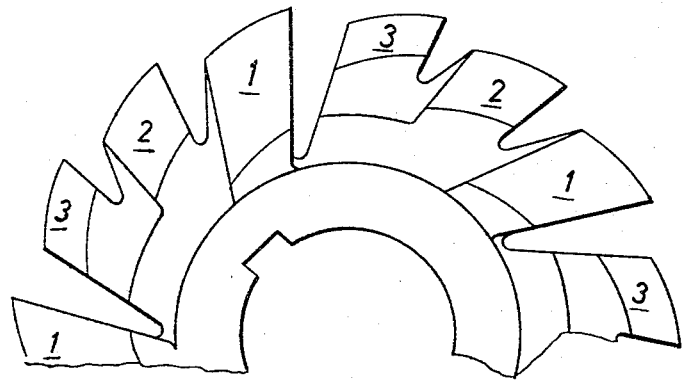
FIG. 3 is a fragmentary end elevational view of a second hob with fifteen rows of teeth.
Figure 4:
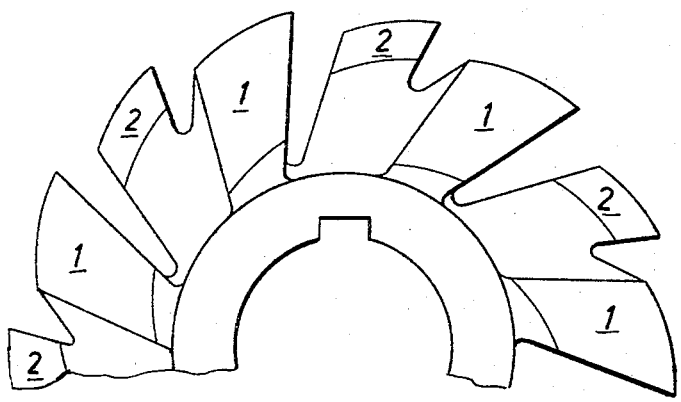
FIG. 4 is a fragmentary end elevational view of a third hob with fourteen rows of teeth.

While FIGS. 1 and 1a show that the teeth are arranged in the sequence 1-3-2-3-1, such sequence may be changed to 1-2-3-1-2-3 as in FIG. 3 or to 1-2-1-2 as in FIG. 4. All teeth have the same pitch and lie on the common helix, see FIG. 1. They can be backed off or ground to provide a relief angle.

Sharpening of the improved hob to form the cutting edges $e_1$, $e_2$, $e_3$ can be carried out in normal hob grinding machines in such a way that, in the first stage, all of the teeth 1, 2 and 3 are ground to exact pitch at the chip groove depth $t_3$. In the next step, the teeth 2 are ground to the full chip groove depth $t_2$, and the teeth 1 are ground to the full chip groove depth $t_1$ in a next-following step. In the grinding of the hob shown in FIG. 1, first a 16 pitch index plate is used to grind all of the teeth in each of the sixteen rows to the depth $t_3$. In the next operation, a 4 pitch index plate is used to grind the teeth 2 to the depth $t_3$ or, alternatively, an 8 pitch index plate is used to grind the teeth 1 and 2 to the depth $t_2$. In the final step, a 4 pitch index plate is used to grind the teeth 1 to the deph $t_1$. In grinding the hob of FIG. 3, one resorts in the final step to a five-pitch index plate. Precise lead of gash can be obtained because the cutting surfaces in the outer portions of teeth are ground in the first step only and the transition between consecutively ground portions of the cutting surfaces is gradual and smooth.

The hob of FIG. 3 differentiates from the hob of FIG. 1 in that it comprises fifteen axially extending rows of teeth and that it includes five rows each of teeth 1, 2 and 3.

FIG. 4 shows a hob with fourteen rows of teeth including seven rows of teeth 1 and seven rows of teeth 2. The teeth of each pair of consecutive finishing teeth 1 (as seen in the direction of the helix) are separate from each other by at least one tooth 2 or 3, i.e., by at least one tooth whose length or whole depth ($h_2$ or $h_3$) is less than the length $h_1$.

Figure 2:
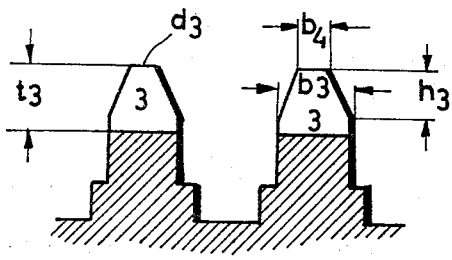
Figure 2A:
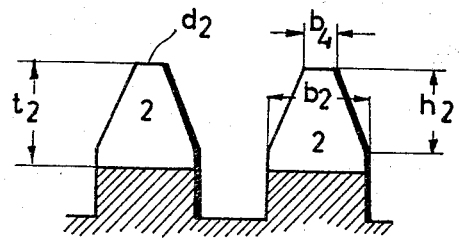
Figure 2B:
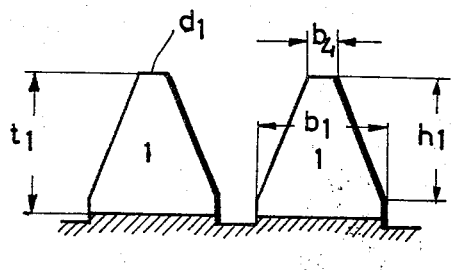

My improved hob differentiates from so-called single-position hobs with a finishing tooth in that each of its teeth 1, 2 and 1, 2 and 3 has the final finishing profile. This is best shown in FIGS. 2, 2a and 2b which illustrate that the width $b_4$ of the top lands $d_1$, $d_2$ and $d_3$ on all of the teeth 1-3 is the same and that the inclination of all tooth flanks adjacent to the respective top lands is also the same. The improved hob works equally satisfactorily in each setting position, i.e., in the same way as a conventional hob.

While it has been originally designed for hobbing with high infeed rates (rough hobbing), the hob of my invention has proven to be just as satisfactory for finish hobbing.

Another important advantage of my hob is that it may be provided with an axial bore 5 of relatively large diameter. This is of importance is hobs which are provided with a keyway drive.

The pitch of all teeth on the improved hob may be the same. The number of intermediate teeth 2 and 3 of lesser length will depend on the overall number of teeth, on the infeed rate, on the dimensions of the workpiece and on certain other factors. The designer can select the number of teeth 1, 2 and 3 in such a way that the wear at the top lands of the teeth is reduced considerably to lengthen the useful life of the hob and to avoid the need for frequent regrinding. The number of cutting edges which penetrate into the material of the workpiece will determine the wear on the teeth of the hob.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. A rotary milling cutter, comprising a plurality of teeth forming a helix around the periphery of the cutter and arranged in a plurality of substantially axially extending rows, said rows including rows consisting of teeth having a first length and rows consisting of teeth having a length which is less than said first length, each of said teeth having a top land provided with a cutting edge and two mutually inclined side faces flanking said cutting edge, and the mutual inclination of said side faces and the width of said top lands being the same on all of the said teeth.

2. A hob, comprising a plurality of teeth forming a helix around the periphery of the hob and arranged in a plurality of substantially axially extending rows, said rows including first rows consisting of teeth having a first length and second rows consisting of teeth having a length which is less than said first length, the rows of each pair of consecutive first rows being separated from each other by at least one second row and all of said teeth having the same pitch, each of said teeth having a top land provided with a cutting edge and two mutually inclined side faces flanking said cutting edge, and the mutual inclination of said side faces and the width of said top lands being the same on all of said teeth.

3. A rotary milling cutter, comprising a plurality of teeth forming a helix around the periphery of the cutter and arranged in a plurality of substantially axially extending rows, said rows including first rows consisting of teeth having a first length and second rows consisting of teeth having a length which is less than said first length, said second rows including rows having teeth of different length, each of said teeth having a top land provided with a cutting edge and two mutually inclined side faces flanking said cutting edge, and the mutual inclination of said side faces being the same on all of said teeth, said top lands on all of said teeth being of equal width and relieved rearwardly of the respective cutting edges.

4. A rotary milling cutter, comprising a plurality of teeth forming a helix around the periphery of the cutetr and arranged in a plurality of substantially axially extending rows, said rows including rows consisting of first teeth having a first length and rows consisting of second teeth having a length which is less than said first length, at least some of said teeth being inserted teeth, each of said teeth having a top land provided with a cutting edge and two mutually inclined side faces flanking said cutting edge, and the mutual inclination of said side faces being the same on all of said teeth, said top lands on all of said teeth being of equal width and relieved rearwardly of the respective cutting edges and the relief of said top lands of said first teeth being different from the relief of said top lands of said second teeth.

5. A milling cutter, particularly for rough hobbing of gear blanks, as set forth in claim 1, wherein said top lands of said teeth are equidistant from the axis of the hob and wherein the outer portions of all of said teeth in the zones adjacent to the top lands thereof are of identical size and shape so that all such outer portions participate in initial removal of material from a blank.

6. A cutter as set forth in claim 5, wherein the teeth of each pair of consecutive teeth of first length along said helix are separated from each other by at least one tooth whose length is less than said first length.

7. A cutter as set forth in claim 6 wherein said teeth whose length is less than said first length include teeth of different lengths and wherein the teeth of each pair of consecutive teeth of first length along said helix are separated from each other by a plurality of said teeth whose length is less than said first length, said latter teeth having different lengths.

8. A cutter as set forth in claim 6, wherein said teeth have top lands of identical width and wherein said teeth whose length is less than said first length constitute second teeth whose overall width is less than the overall width of said first teeth.

9. A cutter as set forth in claim 6, wherein said teeth are configurated in such a way that all of said teeth participate in removal of more than fifty percent of material from a blank.

10. A cutter as set forth in claim 6, wherein said teeth are substantially axially extending rows and wherein each such row consists of teeth having the same length.

11. A cutter as set forth in claim 10, wherein said helix comprises a plurality of convolutions and wherein the number of said rows exceeds ten.

References Cited
UNITED STATES PATENTS

| | | | |
|---|---|---|---|
| 1,096,164 | 5/1914 | Fawcus | 29—103 |
| 2,410,544 | 11/1946 | Mackmann | 29—103 X |
| 2,567,167 | 9/1951 | Drader | 29—105 |
| 2,706,848 | 4/1955 | Riley | 29—105 |

HARRISON L. HINSON, *Primary Examiner.*